United States Patent
Yoneya et al.

(10) Patent No.: US 10,641,186 B2
(45) Date of Patent: May 5, 2020

(54) INTERNAL COMBUSTION ENGINE CONTROL APPARATUS

(71) Applicant: HITACHI AUTOMOTIVE SYSTEMS, LTD., Hitachinaka-shi, Ibaraki (JP)

(72) Inventors: Naoki Yoneya, Tokyo (JP); Masayuki Saruwatari, Tokyo (JP); Kazuhiro Oryoji, Tokyo (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 25 days.

(21) Appl. No.: 16/076,755

(22) PCT Filed: Jan. 13, 2017

(86) PCT No.: PCT/JP2017/000914
§ 371 (c)(1),
(2) Date: Aug. 9, 2018

(87) PCT Pub. No.: WO2017/145554
PCT Pub. Date: Aug. 31, 2017

(65) Prior Publication Data
US 2019/0048807 A1    Feb. 14, 2019

(30) Foreign Application Priority Data
Feb. 26, 2016    (JP) .................. 2016-035029

(51) Int. Cl.
*F02D 13/02* (2006.01)
*F02D 43/00* (2006.01)
(Continued)

(52) U.S. Cl.
CPC ..... *F02D 13/0261* (2013.01); *F02D 13/0215* (2013.01); *F02D 15/02* (2013.01);
(Continued)

(58) Field of Classification Search
CPC ............ F02D 13/0261; F02D 13/0265; F02D 13/0215; F02D 13/0234; F02D 15/02;
(Continued)

(56) References Cited

U.S. PATENT DOCUMENTS

| 2001/0035008 A1 | 11/2001 | Nozawa et al. |
| 2005/0000492 A1* | 1/2005 | Nakai ................. F02D 13/0215 123/406.45 |

(Continued)

FOREIGN PATENT DOCUMENTS

| JP | H08-291729 A | 11/1996 |
| JP | 2004-144101 A | 5/2004 |

(Continued)

OTHER PUBLICATIONS

Supplementary European Search Report issued in corresponding European Patent Application No. 17755996.0 dated Sep. 3, 2019.

(Continued)

*Primary Examiner* — Mahmoud Gimie
(74) *Attorney, Agent, or Firm* — Foley & Lardner LLP

(57) ABSTRACT

Because an in-cylinder temperature becomes low immediately after cold starting, it is impossible to take large ignition timing retard to avoid combustion instability and it takes time to activate a catalyst existing downstream of an internal combustion engine.

The present invention provides an internal combustion engine control apparatus including an ignition timing control unit to control an ignition timing of an ignition device attached to an internal combustion engine. The internal combustion engine control apparatus includes an in-cylinder temperature raising unit that raises an in-cylinder temperature, the in-cylinder temperature is raised by the in-cylinder (Continued)

temperature raising unit, and a retard amount of the ignition timing of the ignition device is increased by the ignition timing control unit.

5 Claims, 9 Drawing Sheets

(51) Int. Cl.
*F02D 15/02* (2006.01)
*F02D 37/02* (2006.01)
*F02D 41/06* (2006.01)
*F02D 41/02* (2006.01)
*F02P 5/15* (2006.01)
*F02D 41/00* (2006.01)
*F02D 21/10* (2006.01)
*F02M 23/00* (2006.01)
*F02B 75/12* (2006.01)
*F02D 41/14* (2006.01)
*F02D 41/30* (2006.01)

(52) U.S. Cl.
CPC ......... *F02D 37/02* (2013.01); *F02D 41/0002* (2013.01); *F02D 41/0255* (2013.01); *F02D 41/064* (2013.01); *F02D 41/068* (2013.01); *F02D 43/00* (2013.01); *F02P 5/1504* (2013.01); *F02P 5/1506* (2013.01); *F02B 2075/125* (2013.01); *F02D 13/0234* (2013.01); *F02D 13/0265* (2013.01); *F02D 21/10* (2013.01); *F02D 41/1497* (2013.01); *F02D 41/3035* (2013.01); *F02D 2041/001* (2013.01); *F02M 2023/008* (2013.01); *Y02T 10/18* (2013.01); *Y02T 10/46* (2013.01)

(58) Field of Classification Search
CPC ............. F02D 41/0002; F02D 41/0255; F02D 41/0264; F02D 41/0268; F02D 41/1497; F02D 41/3035; F02D 43/00; F02D 21/10; F02D 2041/001; F02D 2023/008; F02P 5/1504; F02P 5/1506
USPC ...................................... 123/339.1
See application file for complete search history.

(56) References Cited

U.S. PATENT DOCUMENTS

| 2010/0222986 | A1 | 9/2010 | Ishii et al. |
| 2012/0221225 | A1 | 8/2012 | Shigenaga et al. |
| 2012/0222407 | A1 | 9/2012 | Miwa et al. |
| 2013/0047958 | A1 | 2/2013 | Yamakawa et al. |

FOREIGN PATENT DOCUMENTS

| JP | 2004-176607 A | 6/2004 |
| JP | 2009-127428 A | 6/2009 |
| JP | 2009-162187 A | 7/2009 |
| JP | 2009-191649 A | 8/2009 |
| JP | 2013-525654 A | 6/2013 |
| JP | 5472076 B2 | 4/2014 |

OTHER PUBLICATIONS

International Search Report with English translation and Written Opinion issued in corresponding application No. PCT/JP2017/000914 dated May 16, 2017.

* cited by examiner

INTERNAL COMBUSTION ENGINE CONTROL APPARATUS

TECHNICAL FIELD

The present invention relates to an internal combustion engine that directly injects fuel into a cylinder and burns the fuel mainly by ignition.

BACKGROUND ART

Conventionally, a spark ignition type gasoline engine that directly injects fuel into a cylinder is known. As characteristic technology of this type of engine, there is widely known a method in which the fuel is injected in a compression stroke at the time of starting, an air-fuel mixture is caused to be deviated to the vicinity of an ignition plug, an ignition timing is retarded at the same time, a ratio of combustion not generating an effective torque, that is, so-called afterburning is increased to raise an exhaust temperature, and activation of a catalyst is accelerated to reduce unburned hydrocarbon (hereinafter, referred to as HC) in an exhaust. As a background art of this technical field, there is JP 8-291729 A (PTL 1).

CITATION LIST

Patent Literature

PTL 1: JP 8-291729 A

SUMMARY OF INVENTION

Technical Problem

Generally, when a retard amount of the ignition timing increases, an exhaust temperature can be raised and it is advantageous for early activation of the catalyst. However, combustion stability tends to be deteriorated in accordance with the retard.

For the retard amount, a value determined in advance in accordance with an oil temperature or the like is set by referring to a map of a computer for control. Because an in-cylinder temperature becomes low immediately after cold starting, it is impossible to take large ignition timing retard to avoid the combustion instability and it takes time to activate the catalyst existing downstream of an internal combustion engine.

An object of the present invention is to rapidly increase an in-cylinder temperature immediately after starting, increase an ignition timing retard amount, and decrease a discharge amount of HC by early activation of a catalyst.

Solution to Problem

To solve the above problem, the present invention provides an internal combustion engine control apparatus including an ignition timing control unit to control an ignition timing of an ignition device attached to an internal combustion engine. The internal combustion engine control apparatus includes an in-cylinder temperature raising unit that raises an in-cylinder temperature, the in-cylinder temperature is raised by the in-cylinder temperature raising unit, and a retard amount of the ignition timing of the ignition device is increased by the ignition timing control unit.

Advantageous Effects of Invention

According to the present invention, by executing control in which in-cylinder temperature raising is prioritized first at the time of catalyst warm-up, combustion stability can be secured and a retard amount of an ignition timing can be increased accordingly. By increasing the retard amount of the ignition timing, an amount of heat flowing into an exhaust pipe is increased, a catalyst warm-up time is shortened, and an exhaust at the time of starting is reduced.

DESCRIPTION OF EMBODIMENTS

Embodiments of the present invention will be described below using the drawings.

First Embodiment

Hereinafter, a configuration and an operation of an engine control apparatus according to a first embodiment of the present invention will be described using FIGS. 1 to 6.

Figure 1:
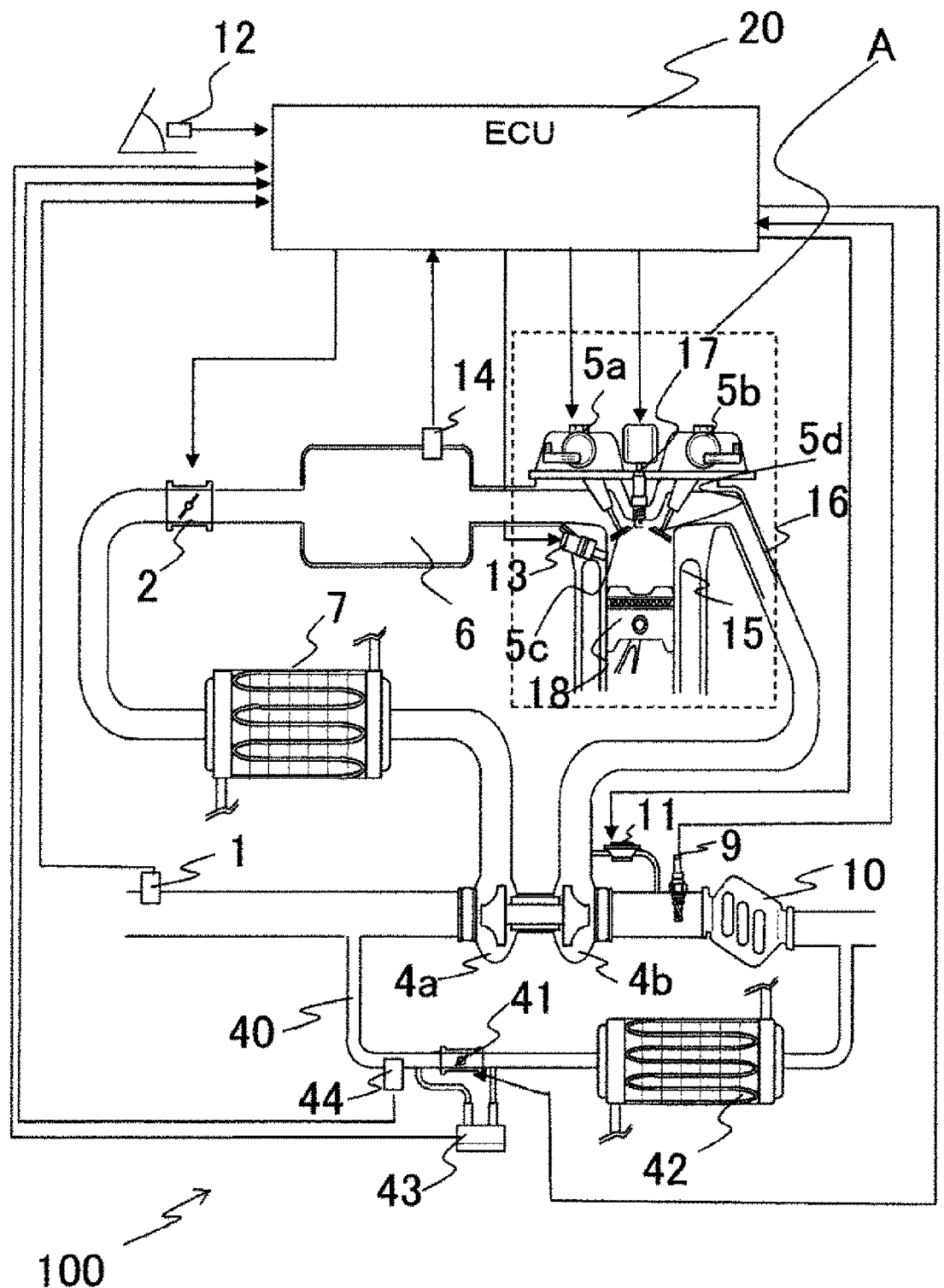
FIG. 1 is a system configuration diagram in which an engine control apparatus according to a first embodiment of the present invention is applied to a cylinder injection type gasoline engine for a vehicle.

FIG. 1 is a system configuration diagram in which the engine control apparatus according to this embodiment is applied to a cylinder injection type gasoline engine for a vehicle.

An engine 100 is a four-cylinder gasoline engine for a vehicle that performs spark ignition type combustion. An air flow sensor 1 that measures an intake air amount, a compressor 4a of a supercharger that supercharges intake air, an intercooler 7 that cools the intake air, an electronically controlled throttle 2 that adjusts an intake pipe pressure, and an intake pressure sensor 14 that measures a pressure in an intake manifold 6 are provided at appropriate positions of an intake pipe. For each cylinder, the engine 100 includes a fuel injection device (hereinafter, referred to as an injector) 13 that injects fuel into a cylinder 15 of each cylinder, a piston 18 that compresses an air-fuel mixture of injected fuel and air, and an ignition plug 17 that supplies ignition energy. An intake valve 5c that is opened when gas is caused to flow into the cylinder, an exhaust valve 5d that is opened when the gas is discharged, and variable valve timing mechanisms 5a (intake side) and 5b (exhaust side) that adjust opening and closing timings of the intake and exhaust valves and adjust the gas flowing into or discharged from the cylinder are provided in a cylinder head. An intake amount and an internal EGR amount are adjusted by adjusting valve opening and closing timings of the intake and exhaust valves of all cylinders from a first cylinder to a fourth cylinder by the variable valve timings 5a and 5b. Although not shown in the drawings, a high-pressure fuel pump for supplying high-pressure fuel to the injector 13 is connected to the injector 13 by a fuel pipe and a fuel pressure sensor for measuring a fuel injection pressure is included in the fuel pipe.

In addition, a turbine 4b that applies a rotation force to the compressor 4a of the supercharger by the exhaust energy, an electronically controlled wastegate valve 11 that adjusts a flow rate of exhaust flowing into the turbine, a three-way catalyst 10 that purifies the exhaust, and an air-fuel ratio sensor 9 that is one aspect of an air-fuel ratio detector and detects an air-fuel ratio of the exhaust at the upstream side of the three-way catalyst 10 are provided at appropriate positions of an exhaust pipe 16. Although not shown in the drawings, a crankshaft is provided with a crank angle sensor for calculating a rotation angle.

In addition, an EGR pipe 40 that returns the exhaust from the downstream side of the catalyst 10 of the exhaust pipe to the upstream side of the compressor 4a of the intake pipe is provided. In addition, an EGR cooler 42 that cools EGR, an EGR valve 41 that controls an EGR flow rate, a differential pressure sensor 43 that detects a differential pressure across the EGR valve, and an EGR temperature sensor 44 that detects an EGR temperature are attached to appropriate positions of the EGR pipe 40.

Signals obtained from the air flow sensor 1, the air-fuel ratio sensor 9, the intake pressure sensor 14, the differential pressure sensor 43, and the EGR temperature sensor 44 are sent to an engine control unit (ECU) 20. In addition, a signal obtained from an accelerator opening sensor 12 is sent to the ECU 20. The accelerator opening sensor 12 detects a depression amount of an accelerator pedal, that is, an accelerator opening. The ECU 20 operates a required torque on the basis of an output signal of the accelerator opening sensor 12. That is, the accelerator opening sensor 12 is used as a required torque detection sensor to detect the required torque to the engine. In addition, the ECU 20 operates a rotation speed of the engine on the basis of an output signal of the crank angle sensor. The ECU 20 optimally operates main operation amounts of the engine such as an air flow rate, a fuel injection amount, an ignition timing, and a fuel pressure, on the basis of an operating state of the engine obtained from the outputs of the various sensors.

The fuel injection amount operated by the ECU 20 is converted into a valve opening pulse signal and is sent to the injector 13. In addition, an ignition signal is sent to the ignition plug 17 to be ignited at the ignition timing operated by the ECU 20. In addition, a throttle opening operated by the ECU 20 is sent as a throttle drive signal to the electronically controlled throttle 2. In addition, a variable valve timing operation amount operated by the ECU 20 is sent as a variable valve timing drive signal to a variable valve timing 5. In addition, the wastegate valve 11 is a device that fractionates a part of the exhaust and adjusts an inflow amount to the compressor. A wastegate valve opening operated by the ECU 20 is sent as a wastegate valve drive signal to the wastegate valve 11. In addition, an EGR valve opening operated by the ECU 20 is sent as an EGR valve opening drive signal to the EGR valve 41.

The fuel is injected into the air flowing into the cylinder 15 from the intake pipe via the intake valve to form an air-fuel mixture. The air-fuel mixture explodes due to a spark generated from the ignition plug 17 at a predetermined ignition timing and pushes down the piston by a combustion pressure thereof to generate a drive force of the engine. The exhaust gas after the explosion is sent to the three-way catalyst 10 via the exhaust pipe 16 and an exhaust component is purified in the three-way catalyst 10 and is discharged to the outside.

Figure 2:
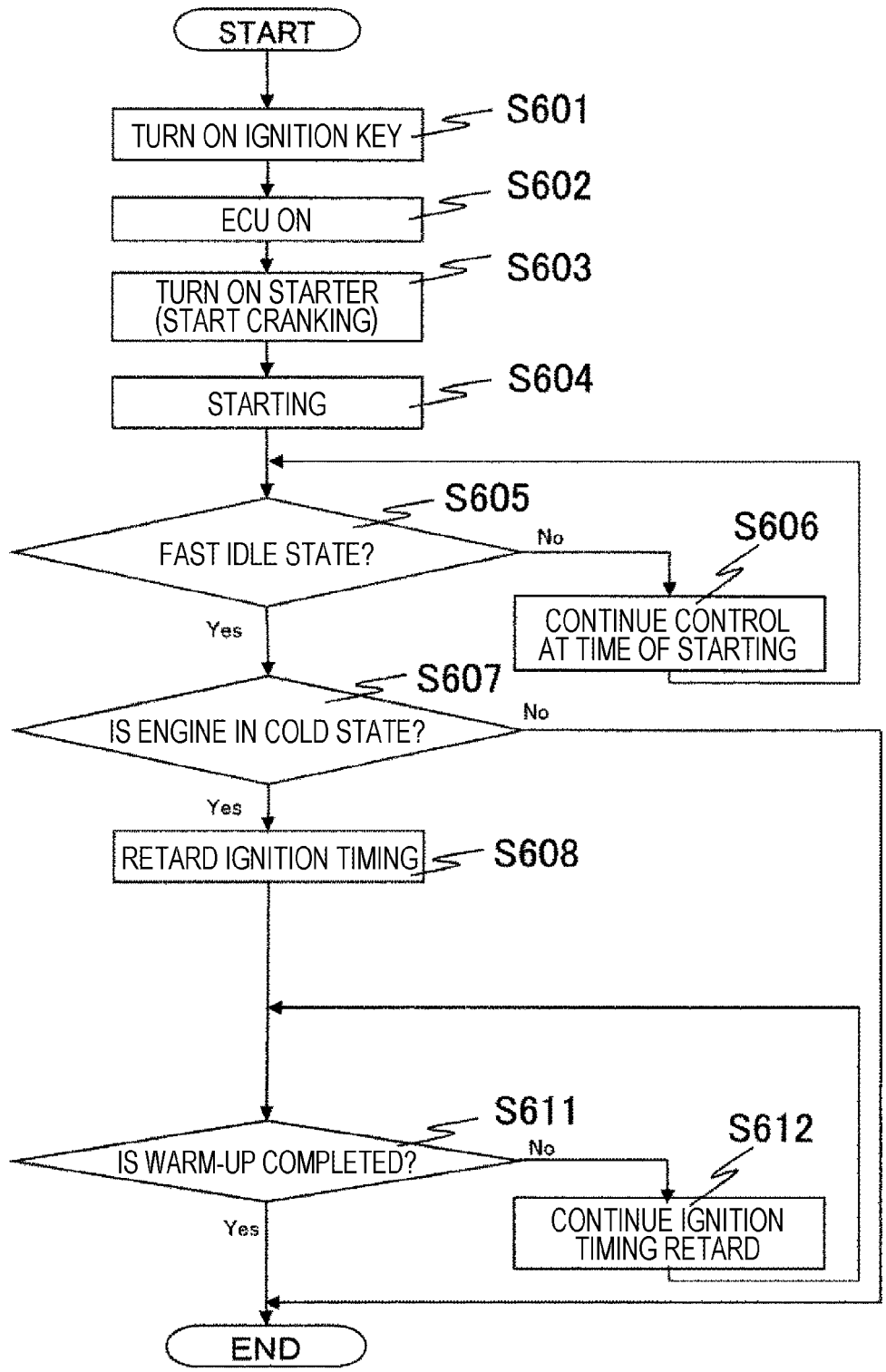
FIG. 2 is a system block diagram showing an example of control from starting of a general engine control apparatus to completion of catalyst warm-up.

FIG. 2 is a system block diagram showing an example of a control flow from starting of an engine of the engine control apparatus to completion of catalyst warm-up. When an ignition key is turned on in step S601, a process proceeds to S602 and energization to the ECU 20 is turned on. Next, when energization to a starter is turned on in S603, a starter motor is driven and the crankshaft starts to rotate. In S604, fuel injection and ignition are performed to start the engine. Immediately after starting the engine from a cold state, an engine speed is temporarily set to a speed higher than that in an idle state for engine rotation holding or engine warm-up. This is called a fast idle state. When it is determined in S605 that the engine has entered the fast idle state after the engine starts, on the basis of the engine speed, it is determined in S607 whether or not the engine is in the cold state.

The ECU 21 determines whether or not the engine 100 is in the cold state, on the basis of an oil temperature or a water temperature in the engine. Here, the oil temperature is a temperature of engine oil circulated in the engine to increase lubricity of sliding portions in the engine, such as the variable valve timings 5a and 5b and the piston 18. The water temperature is a temperature of cooling water that flows through the outside of a wall surface of the cylinder 15 and protects the engine from heat generated by combustion. Both the oil temperature and the water temperature are detected by temperature sensors embedded in the engine. For example, when both the oil temperature and the water temperature are 80° C. or less, the ECU 21 determines that the engine is in the cold state. When it is determined in S607 that the engine is in the cold state, in S608, warm-up by ignition timing retard to retard the ignition timing more than a timing after a top dead center starts. When the ignition timing is retarded, a period during which the combustion gas pushes down the piston for work decreases and a ratio of an exhaust loss in total energy generated by the combustion relatively increases. The heat is discharged as the exhaust loss from an internal combustion engine and is transferred to machines such as the exhaust pipe 16 and the three-way catalyst 10 existing at the downstream side, so that engine warm-up is promoted. When a retard amount of the ignition timing increases, the exhaust temperature increases and the engine warm-up is promoted.

In S611, when the temperature of the catalyst is detected on the basis of the temperature sensor mounted on the catalyst and the temperature reaches an activation temperature (about 400° C.) of the catalyst, it is determined that the warm-up of the engine has been completed. When it is determined in S611 that the warm-up has been completed, catalyst warm-up control ends and the process proceeds to normal control.

In S608, the ignition timing retard is performed. However, immediately after cold starting, a temperature in the cylinder 15 is low and it is impossible to take large ignition timing retard to avoid combustion instability. In this case, there is a problem in that the exhaust temperature cannot be increased and an activation time of the catalyst existing downstream of the internal combustion engine cannot be shortened.

Figure 3:
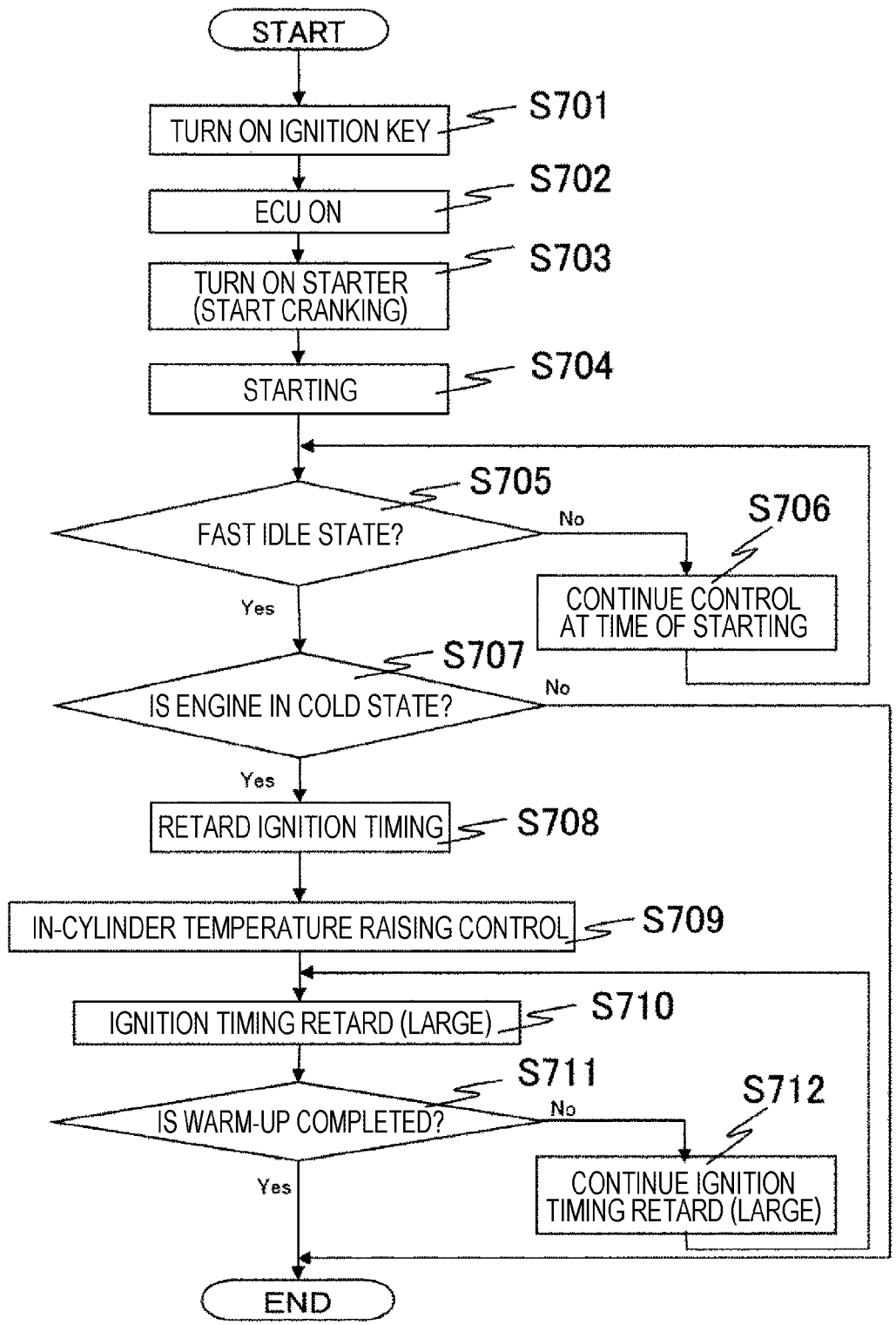
FIG. 3 is a system block diagram showing an example of control from starting of the engine control apparatus according to the first embodiment of the present invention to completion of catalyst warm-up.

FIG. 3 is a system block diagram showing a control flow of the engine in this embodiment from the engine starting to the catalyst warm-up completion. Because steps S701 to S707 are the same as S601 to S607 in FIG. 2, description thereof is omitted. Although the ignition timing is retarded in S708, immediately after the cold starting, the temperature in the cylinder 15 is low and it is impossible to take the large ignition timing retard to avoid the combustion instability.

Therefore, a central processing unit (CPU) included in the ECU 20 according to this embodiment has an in-cylinder temperature raising unit that raises a gas temperature in the cylinder 15 by performing in-cylinder temperature raising control in S709. By raising the gas temperature in the cylinder 15 by the in-cylinder temperature raising unit, the cooling loss, that is, an amount of heat transferred to the wall surface increases and the risk of combustion instability is reduced.

In addition, the central processing unit (CPU) included in the ECU 20 according to this embodiment has an ignition timing control unit that controls the ignition timing of the ignition device (ignition plug 17) attached to the engine. In addition, the ignition timing control unit controls the ignition timing of the ignition plug 17 to increase the ignition timing retard amount in S710 after the temperature increase in the cylinder by the in-cylinder temperature raising unit in S709 with respect to the ignition timing retard amount in S708 before raising the gas temperature in the cylinder 15 by the in-cylinder temperature raising unit in S709.

In S711, it is determined whether or not warm-up of the engine has been completed, on the basis of the catalyst temperature. When it is determined in S711 that the warm-up has been completed, the catalyst warm-up control ends and the process proceeds to the normal control.

As described above, in this embodiment, the CPU of the ECU 20 has the in-cylinder temperature raising unit and the ignition timing control unit and raises the in-cylinder temperature by the in-cylinder temperature raising unit before increasing the ignition timing retard amount. As a result, the risk of combustion instability is reduced and the ignition timing retard amount is increased more than the retard amount before raising the in-cylinder temperature by the ignition timing control unit, thereby raising the exhaust temperature. Therefore, the catalyst warm-up time can be reduced and the exhaust at the time of starting can be reduced.

Figure 4:
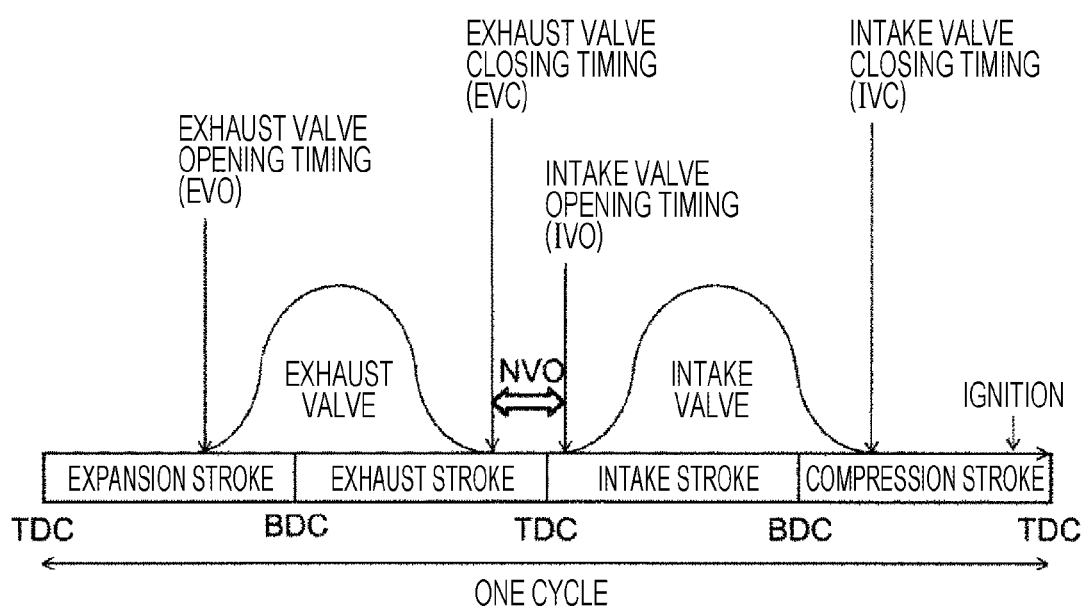
FIG. 4 is a cam profile diagram showing operations of intake and exhaust valves during one cycle in the engine control apparatus according to the first embodiment of the present invention.

FIG. 4 is a diagram for explaining operations of the intake valve and the exhaust valve as an example of the in-cylinder temperature raising unit of the CPU (control unit) of the ECU 20 in this embodiment and shows the valves are opened in a period where a waveform is swollen in an angular shape. Here, a TDC (Top Dead Center) is a top dead center of the piston, a BDC (Bottom Dead Center) is a bottom dead center of the piston, and the piston 18 performs a vertical reciprocating motion between the top dead center and the bottom dead center in the cylinder 15 of the engine. In this embodiment, a 4-stroke/1-cycle engine that takes four strokes during an operation cycle of the engine will be described as an example.

In an expansion stroke, the air-fuel mixture ignited by the ignition plug 17 burns, the combustion gas expands, and the piston 18 is pushed down to the bottom dead center. In an exhaust stroke, the piston 18 ascends due to inertia and pushes the combustion gas out of the cylinder 15. In an intake stroke, the piston 18 descends and sucks the air-fuel mixture into the cylinder 15. In a compression stroke, the piston 18 ascends to the top dead center and compresses the air-fuel mixture.

The in-cylinder temperature raising unit of the CPU (control unit) of the ECU 20 according to this embodiment controls the variable valve timing mechanism 5b (exhaust side) such that the exhaust valve 5d is opened in the expansion stroke or the exhaust stroke and is closed before the top dead center of the exhaust stroke. On the other hand, the in-cylinder temperature raising unit controls the variable valve timing mechanism 5a (intake side) such that the intake valve 5c is opened in the intake stroke after the top dead center and is closed in the intake stroke or the compression stroke. By performing the control as described above, it is possible to provide a period (NVO (Negative Valve Overlap) period) where the intake valve 5c and the exhaust valve 5d are closed at the same time from the exhaust stroke to the intake stroke and the exhaust is compressed. That is, it is possible to provide a period (NVO period) where the exhaust is compressed when the piston moves toward the top dead center of the exhaust stroke.

The NVO period is provided, so that the gas in the exhaust stroke is confined in the cylinder 15 and compressed, and the gas temperature increases. The gas temperature increases, so that the cooling loss, that is, the amount of heat transferred to the wall surface increases and the in-cylinder temperature increases.

Figure 5:
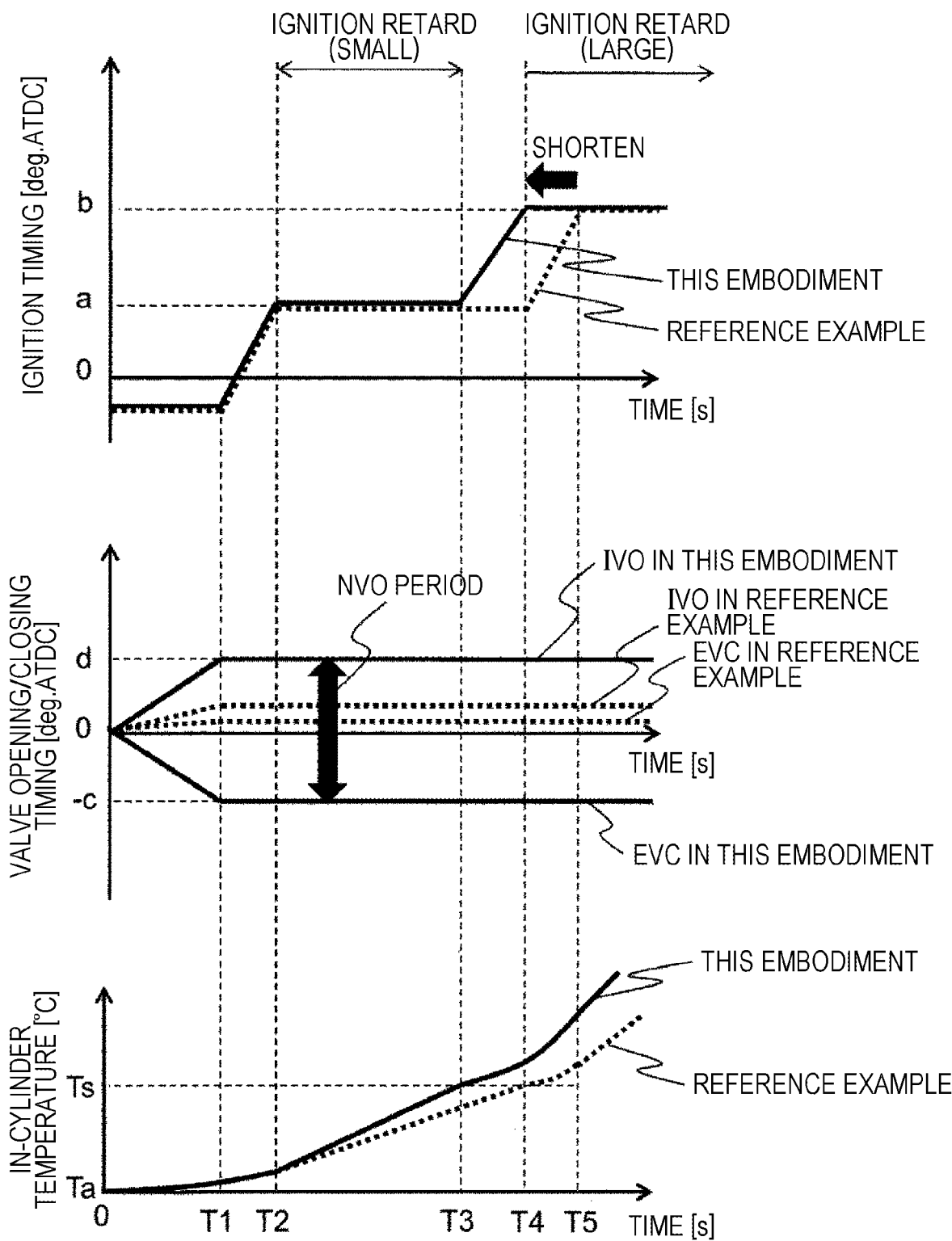
FIG. 5 is a time chart showing valve timings in the engine control apparatus according to the first embodiment of the present invention.

FIG. 5 shows changes in the ignition timing of the ignition plug 17, the valve closing timing of the exhaust valve 5d, the valve opening timing of the intake valve 5c, and the temperature in the cylinder 15 in each cycle by the CPU (control unit) of the ECU 20 according to this embodiment, when one cycle of the engine shown in FIG. 4 is repeated for a constant time. Values in the ECU 20 according to this embodiment are shown by thick lines and values in the ECU 20 according to a reference example to which this embodiment is not applied are shown by dotted lines. Here, for the values of the ignition timing and the valve opening and closing timings on graphs, 0 is the top dead center, a positive direction is a crank angle after the top dead center, and a negative direction is a crank angle before the top dead center. In addition, all of a, b, c, and d of FIG. 5 are positive real numbers.

In the ECU according to the reference example to which this embodiment is not applied, at time 0, the engine is started and at time T1, the ignition timing of the ignition plug 17 is retarded and the warm-up is started. Immediately after the cold starting, the temperature in the cylinder 15 is low, it is impossible to take the large ignition timing retard amount of the ignition plug 17 to avoid the combustion instability, and at time T2, the ignition timing is set to a [deg. ATDC].

The exhaust valve 5d is controlled by the variable valve timing mechanism 5b (exhaust side) to be closed at about 0 [deg. ATDC] to be the top dead center of the piston in the exhaust stroke. That is, the valve closing timing (EVC (Exhaust Valve Close)) is set to about 0 [deg. ATDC] to be the top dead center of the piston in the exhaust stroke, so that complete scavenging of the exhaust is performed. On the other hand, the intake valve 5c is controlled by the variable valve timing mechanism 5a (intake side) to be opened immediately after EVC. That is, the valve opening timing (IVO (Intake Valve Open)) is set to about 0 [deg. ATDC] to be the top dead center of the piston in the exhaust stroke, so that the intake for taking fresh air is started after the exhaust is completely finished. At time 0, the in-cylinder temperature is equal to the ambient temperature Ta. However, at time T4, when the in-cylinder temperature reaches a combustion stabilization temperature Ts, the ignition timing is further retarded and at time T5, the ignition timing is set to b [deg. ATDC], the exhaust temperature is increased, and catalyst temperature raising is accelerated.

On the other hand, the CPU (control unit) of the ECU 20 according to this embodiment starts the engine at time 0, starts the warm-up at time T1, and performs the ignition timing retard. For the ignition timing, immediately after the cold starting, the temperature in the cylinder 15 is low and it is impossible to take the large ignition timing retard amount to avoid the combustion instability and at time T2, the ignition timing is set to a [deg. ATDC]. This point is the same as the reference example.

Here, at time T1, the in-cylinder temperature raising unit of the CPU (control unit) of the ECU 20 according to this embodiment performs control such that the exhaust valve 5d is closed by the variable valve timing mechanism 5b (exhaust side) at −c [deg. ATDC] before the top dead center of the exhaust stroke. On the other hand, the in-cylinder temperature raising unit performs control such that the intake valve 5c is opened by the variable valve timing mechanism 5a (intake side) at d [deg. ATDC] after the top dead center of the exhaust stroke. As such, by controlling the variable valve timing mechanisms 5a and 5b such that the exhaust valve 5d is closed before the top dead center of the exhaust stroke and the intake valve 5c is opened after the top dead center of the exhaust stroke, the NVO period where the intake and exhaust valves are simultaneously closed in the exhaust stroke is formed.

That is, the CPU (control unit) of the ECU 20 controls the variable valve timing mechanisms 5a and 5b such that the ignition timing is gradually retarded from time T1 and the NVO period is formed by the in-cylinder temperature raising unit before the ignition timing reaches a [deg. ATDC].

By the control according to this embodiment, the in-cylinder temperature is equal to the ambient temperature Ta at time 0. However, the in-cylinder temperature is rapidly raised as compared with the reference example, by an in-cylinder temperature raising effect by the provision of the NVO period. When the temperature reaches the predetermined in-cylinder temperature Ts or at predetermined time T3, the CPU (control unit) of the ECU 20 increases the ignition timing retard amount, sets the ignition timing to b [deg. ATDC] further retarded than a [deg. ATDC] at time T4, increases the exhaust temperature, and accelerates catalyst temperature raising. In this embodiment, the ignition timing retard amount can be increased earlier than in the reference example.

As such, by providing the NVO period, the gas temperature in the cylinder 15 increases, the amount of heat transferred to the wall surface increases, the in-cylinder temperature is raised early, and the risk of combustion instability is reduced. Therefore, the ignition timing retard amount is increased early, the exhaust temperature is increased, catalyst temperature raising is accelerated, and time until the catalyst activation is shortened, thereby reducing the exhaust at the time of starting.

Figure 6:
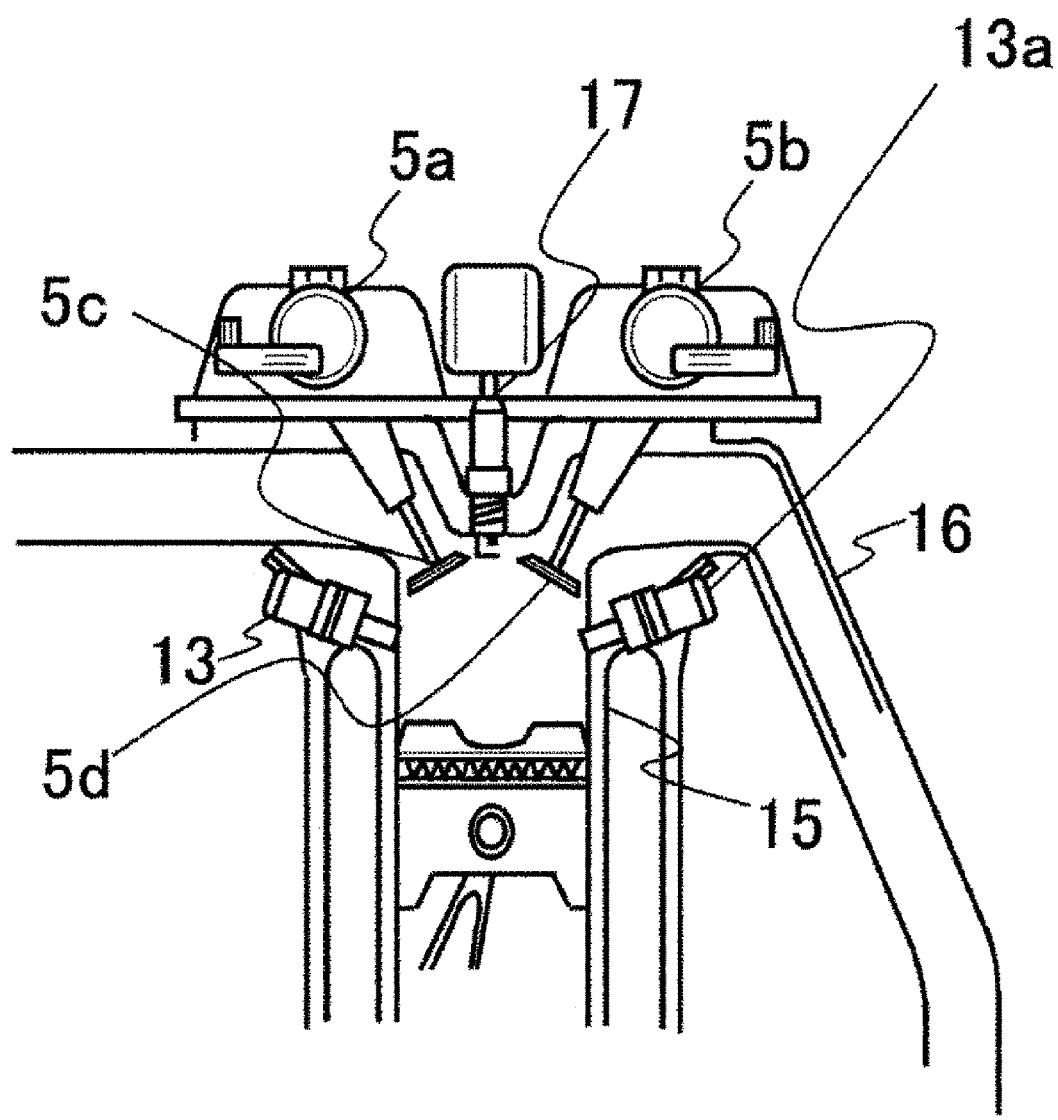
FIG. 6 is a configuration diagram of the vicinity of a cylinder in the case where an injector for gas injection is disposed in the engine control apparatus according to the first embodiment of the present invention.

FIG. 6 is a configuration diagram of the vicinity (portion shown by a dotted line A in FIG. 1) of the cylinder when an injector for gas injection is disposed in the engine control apparatus according to this embodiment. In this embodiment, an injector 13a for gas injection that injects gas such as air directly into the cylinder 15 is provided. By injecting the gas, for example, the air into the cylinder 15 during the exhaust stroke by using the gas injector 13a and increasing a volume of the gas confined in the cylinder 15 during the NVO period, the temperature of the gas compressed in NVO period increases as compared with the case where there is no gas injection. When the temperature reaches the predetermined in-cylinder temperature Ts or at predetermined time T3, the ignition timing retard amount is increased, the ignition timing is set to b [deg. ATDC] at time T4, the exhaust temperature is increased, and the catalyst temperature raising is accelerated.

As such, inert gas is injected during NVO, so that the in-cylinder temperature can be raised more rapidly. The ignition timing retard amount is increased earlier, the exhaust temperature is increased to accelerate the catalyst temperature raising, and the time until the catalyst activation is shortened, so that the exhaust at the time of starting can be reduced.

Second Embodiment

Hereinafter, a second embodiment of the present invention will be described using FIG. 7. In this embodiment, an operation of a CPU (control unit) of an ECU having an in-cylinder temperature raising unit other than provision of an NVO period will be described. A basic configuration of an engine is the same as that of the first embodiment shown in FIG. 1, so description thereof is omitted. In this embodiment, the in-cylinder temperature raising unit of the CPU (control unit) of the ECU 20 raises an in-cylinder temperature by controlling variable valve timing mechanisms.

Figure 7:
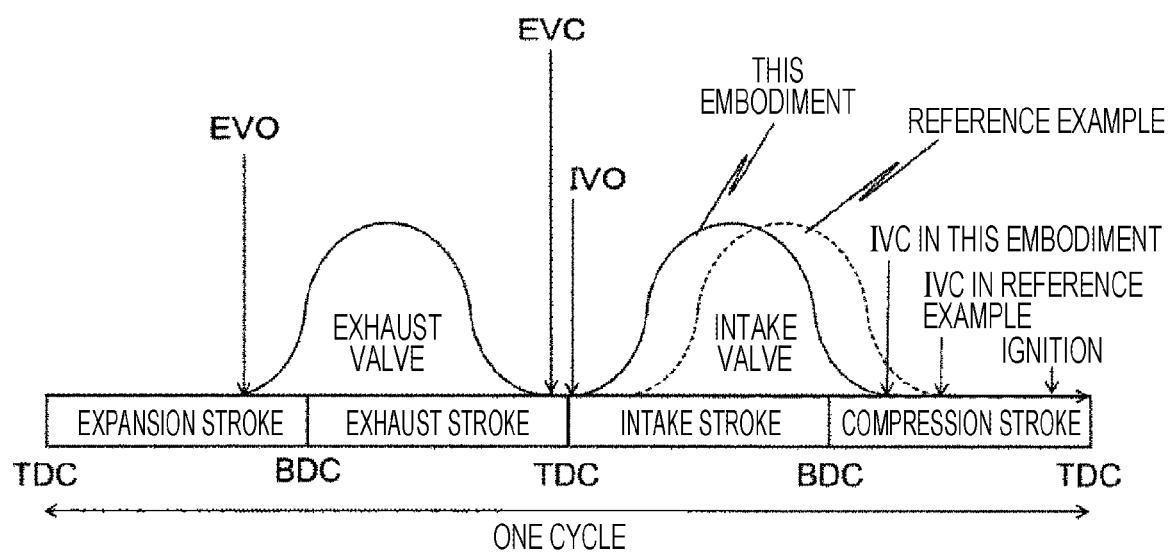
FIG. 7 is a cam profile diagram showing operations of intake and exhaust valves during one cycle by an engine control apparatus according to a second embodiment of the present invention.

FIG. 7 is a diagram for explaining operations of the variable valve timing mechanisms as an example of the in-cylinder temperature raising unit of the CPU (control unit) of the ECU 20 in this embodiment and shows the case where an intake valve 5c or an exhaust valve 5d is opened in a period where a waveform is swollen in an angular shape.

A compression ratio of the engine is divided into two types of a mechanical compression ratio and an actual compression ratio. The mechanical compression ratio is a value obtained by dividing an in-cylinder volume at a bottom dead center of a piston by an in-cylinder volume at a top dead center of the piston and is a compression ratio determined by a structure of the engine. The actual compression ratio is a value obtained by dividing the in-cylinder volume when the intake valve is closed by the in-cylinder volume at the top dead center of the piston and a value thereof can be caused to be smaller than that of the mechanical compression ratio by valve closing timing control of the intake valve. For example, if the intake valve is closed after the bottom dead center, a part of in-cylinder gas is blown back to an intake pipe, the in-cylinder volume decreases, and the compression ratio of the in-cylinder gas decreases. A mechanical compression ratio of a gasoline engine is roughly 10 to 14. In this embodiment, a mechanical compression ratio of 12 will be described as an example.

At the time of starting the engine, when a valve closing timing IVC (IVO (Intake Valve Close)) of the intake valve 5c approaches the bottom dead center, the actual compression ratio increases. By advancing and retarding the valve closing timing from the bottom dead center, the IVC is separated from the bottom dead center and the actual compression ratio decreases. At the time of starting the engine, if the IVC is set to the bottom dead center or the vicinity thereof, the actual compression ratio may increase to the same ratio as the mechanical compression ratio. In this case, an excessive torque is generated at the time of starting and an engine vibration is likely to occur. Conversely, if the IVC is advanced to a middle stage of an intake stroke or is retarded to a middle stage of a compression stroke, the actual compression ratio is excessively low, an air-fuel mixture temperature decreases, and an accidental fire is likely to occur. In consideration of a balance between the engine vibration and accidental fire suppression, the IVC is set to a position where the actual compression ratio is about 10, that is, a position advanced or retarded by 30 deg to 60 deg from the bottom dead center from the intake stroke to the compression stroke. In the reference example, the IVC is set at a position retarded by 60 deg from the bottom dead center and the position is maintained even after the engine is started.

Meanwhile, in this embodiment, the in-cylinder temperature raising unit of the CPU (control unit) of the ECU 20 controls the variable valve timing mechanisms 5a and 5b such that the NVO period is formed in the first embodiment, before the ignition timing reaches a [deg. ATDC] by gradually retarding the ignition timing from time T1 after the engine starting in FIG. 5. However, the in-cylinder temperature is raised by a method different from the above method. More specifically, the in-cylinder temperature raising unit of the CPU (control unit) of the ECU 20 performs control such that the intake valve 5c is closed at the bottom dead center from the intake stroke to the compression stroke or the vicinity of the bottom dead center, before the ignition timing reaches a [deg. ATDC] by gradually retarding the ignition timing from time T1 after the engine starting in FIG. 5. That is, the IVC of the intake valve 5c is set to the bottom dead center from the intake stroke to the compression stroke or the vicinity of the bottom dead center, at time T1 after the engine starting. In a reference example, the IVC is set to a position retarded by 25 deg from the bottom dead center.

Therefore, by increasing the actual compression ratio, the temperature of the compressed air-fuel mixture increases, the amount of heat transferred to the wall surface increases, and an effect of raising the in-cylinder temperature can be obtained. As such, the actual compression ratio is adjusted by using the variable valve timing mechanism, so that the in-cylinder temperature can be raised more rapidly. Therefore, similarly to FIG. 5, when the temperature reaches a predetermined in-cylinder temperature Ts or at predetermined time T3, the CPU (control unit) of the ECU 20 increases the ignition timing retard amount, sets the ignition timing to b [deg. ATDC] further retarded than a [deg. ATDC] at time T4, increases the exhaust temperature, and accelerates catalyst temperature raising. In this embodiment, the ignition timing retard amount can be increased earlier than in the reference example. Therefore, the ignition timing retard amount is increased early, the exhaust temperature is increased, the catalyst temperature raising is accelerated, and time until catalyst activation is shortened, thereby reducing the exhaust at the time of starting.

Third Embodiment

Hereinafter, a third embodiment of the present invention will be described using FIG. 8. In this embodiment, an operation of a CPU (control unit) of an ECU 20 having an in-cylinder temperature raising unit other than provision of an NVO period will be described. A basic configuration of an engine is the same as that of the first embodiment shown in FIG. 1, so description thereof is omitted. In this embodiment, the in-cylinder temperature raising unit of the CPU (control unit) of the ECU 20 further raises an in-cylinder temperature by controlling a variable compression ratio mechanism.

Figure 8:
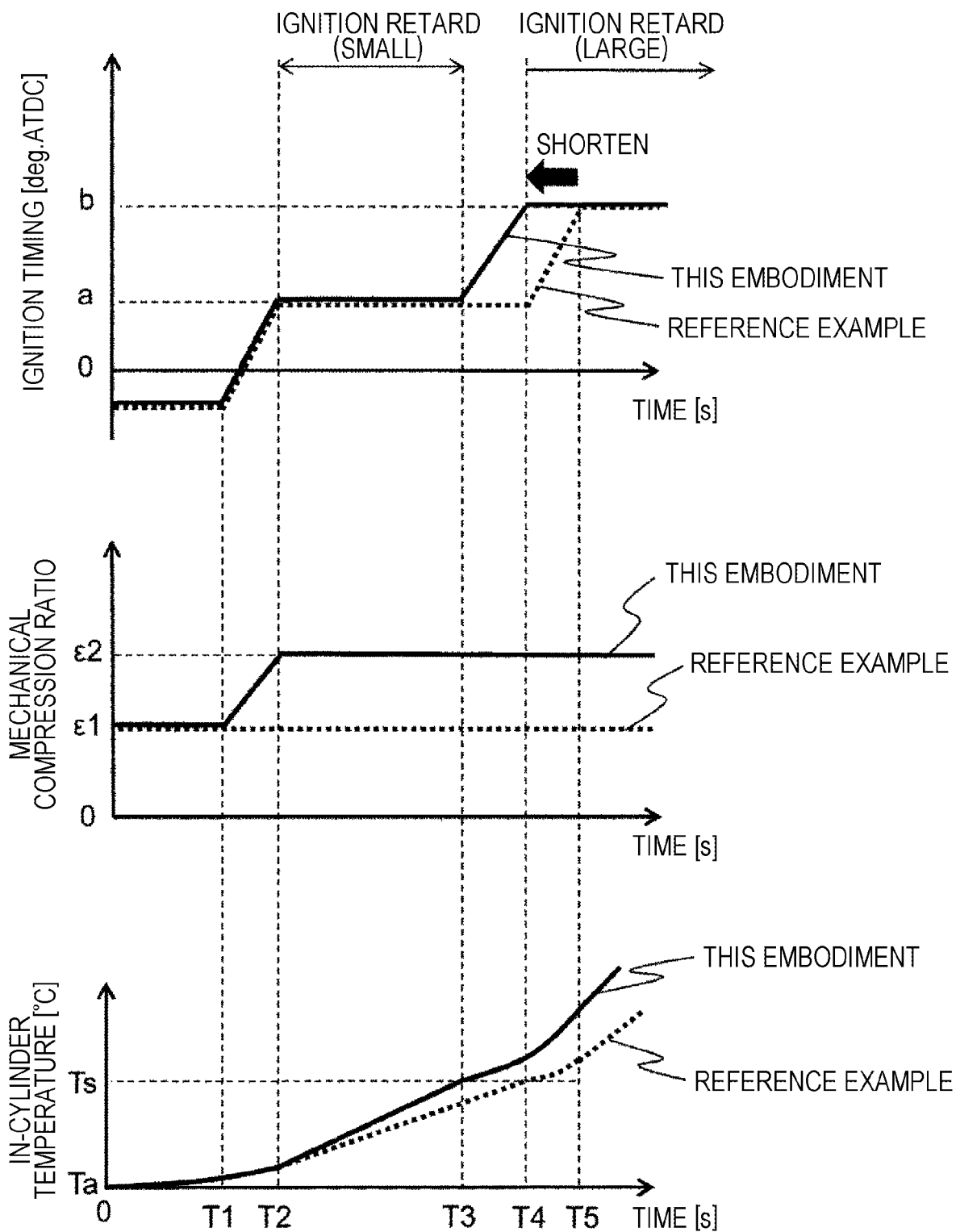
FIG. 8 is a time chart showing a mechanical compression ratio in the case of using a variable compression ratio by the engine control apparatus according to the second embodiment of the present invention.

FIG. 8 shows changes in an ignition timing of an ignition plug 17, a mechanical compression ratio of the variable compression ratio mechanism, and an in-cylinder temperature of a cylinder 15 by the CPU (control unit) of the ECU 20 according to this embodiment. Values in the ECU 20 according to this embodiment are shown by thick lines and values in the ECU 20 according to a reference example to which this embodiment is not applied are shown by dotted lines. Here, for a value of the ignition timing on graphs, 0 is a top dead center, a positive direction is a crank angle after the top dead center, and a negative direction is a crank angle before the top dead center. In addition, both a and b of FIG. 5 are positive real numbers.

The variable compression ratio mechanism is a device that adjusts a stroke amount of a piston 18 and adjusts a mechanical compression ratio of an engine 100. As described above, when an actual compression ratio at the time of starting increases to the same ratio as the mechanical compression ratio, an excessive torque is generated and an engine vibration is likely to occur. Conversely, if the actual compression ratio is excessively low, an air-fuel mixture temperature decreases and an accidental fire is likely to occur. In view of the above, a mechanical compression ratio $\varepsilon 1$ of a general engine is determined on the basis of an adjustment value of the actual compression ratio by variable valve timing mechanisms.

Meanwhile, in this embodiment, the in-cylinder temperature raising unit of the CPU (control unit) of the ECU 20 controls the variable valve timing mechanisms 5a and 5b such that the NVO period is formed in the first embodiment, before the ignition timing reaches a [deg. ATDC] by gradually retarding the ignition timing from time T1 after the engine starting in FIG. 5. However, the in-cylinder temperature is raised by a method different from the above method. More specifically, the in-cylinder temperature raising unit of the CPU (control unit) of the ECU 20 controls the variable compression ratio mechanism such that the mechanical compression ratio is increased from $\varepsilon 1$ to $\varepsilon 2$, before the ignition timing reaches a [deg. ATDC] by gradually retarding the ignition timing from time T1 after the engine starting.

As the mechanical compression ratio increases, a volume of gas compressed in a compression stroke increases, and the air-fuel mixture temperature when the compression stroke ends increases as compared with the case where the mechanical compression ratio is kept at $\varepsilon 1$. As a result, an amount of heat transferred to a wall surface increases and an effect of raising the in-cylinder temperature can be obtained.

As such, the mechanical compression ratio is adjusted by using the variable compression ratio, so that the in-cylinder temperature can be raised more rapidly. The ignition timing retard amount is increased earlier, the exhaust temperature is increased to accelerate the catalyst temperature raising, and the time until the catalyst activation is shortened, so that the exhaust at the time of starting can be reduced.

Fourth Embodiment

Figure 9:
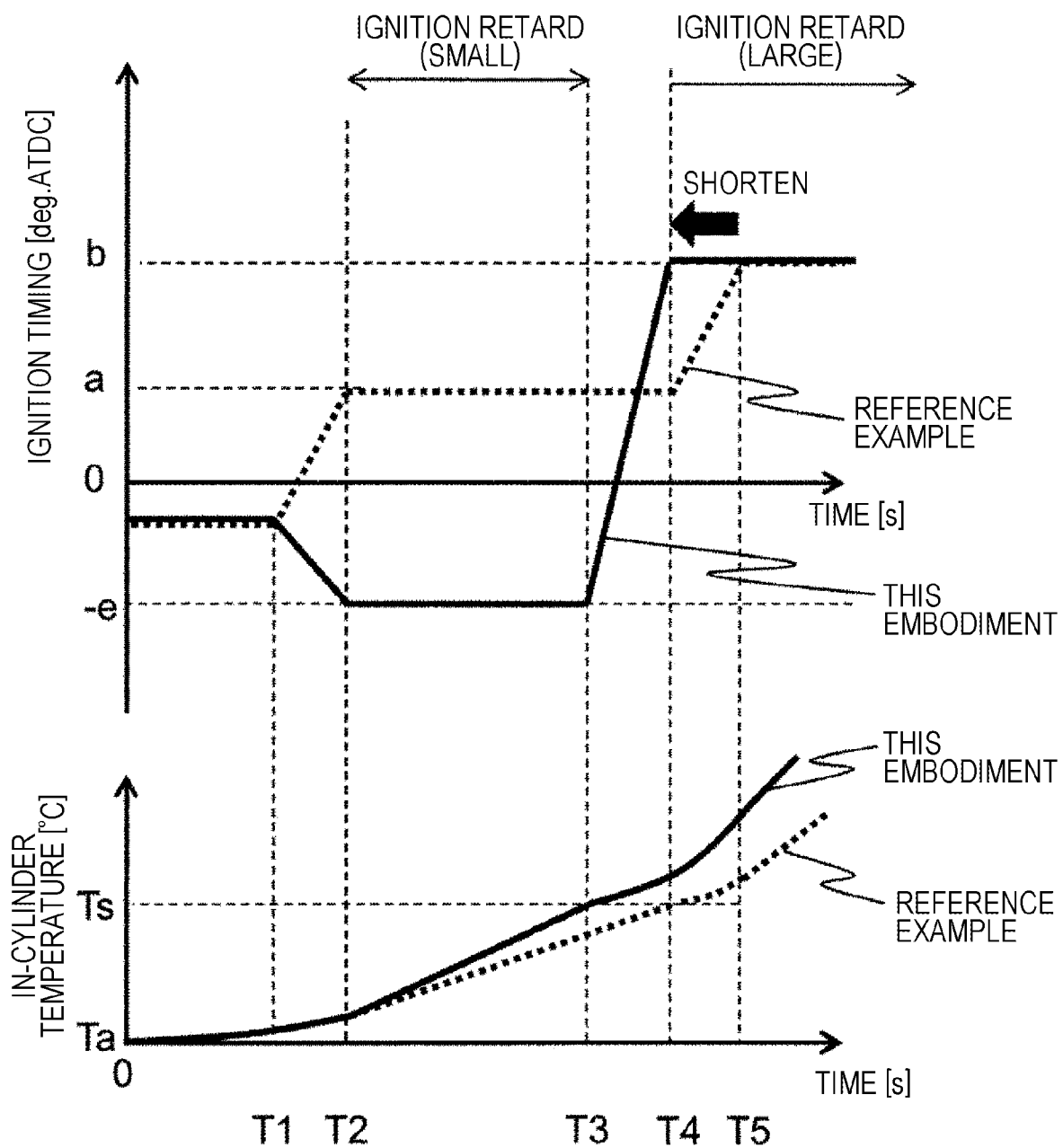
FIG. 9 is a time chart showing an ignition timing by the engine control apparatus according to the second embodiment of the present invention.

Hereinafter, a fourth embodiment of the present invention will be described using FIG. 9. In this embodiment, an operation of a CPU (control unit) of an ECU 20 having an in-cylinder temperature raising unit other than provision of an NVO period will be described. In this embodiment, an in-cylinder temperature raising unit based on an ignition timing change is shown as an in-cylinder temperature raising mechanism other than provision of the NVO period.

FIG. 8 shows changes in an ignition timing of an ignition plug 17 and an in-cylinder temperature of a cylinder 15 by the CPU (control unit) of the ECU 20 according to this embodiment. Values in the ECU 20 according to this embodiment are shown by thick lines and values in the ECU 20 according to a reference example to which this embodiment is not applied are shown by dotted lines. Here, for a value of the ignition timing on graphs, 0 is a top dead center, a positive direction is a crank angle after the top dead center, and a negative direction is a crank angle before the top dead center. In addition, all a, b, and e of FIG. 5 are positive real numbers.

Generally, after initial combustion is completed and an engine is started, an ignition timing is retarded, for example, the ignition timing is set to a [deg. ATDC]. As a result, an exhaust temperature is increased to obtain a catalyst warm-up effect. However, when the ignition timing is retarded, an amount of heat (exhaust loss) to the exhaust becomes dominant in heat losses and an amount of heat (cooling loss) transferred to a wall surface relatively decreases, so that an in-cylinder temperature is not raised early.

In this embodiment, the in-cylinder temperature raising unit of the CPU (control unit) of the ECU 20 according to this embodiment controls the ignition plug 17 such that the ignition timing is advanced after the engine is started, for example, at time T1 when retarding of the ignition timing starts in a reference example. When the ignition timing is advanced, particularly, when the ignition timing is set to −e [deg. ATDC] before a compression top dead center, an ignited air-fuel mixture is compressed and the in-cylinder temperature at the compression top dead center increases greatly as compared with when the ignition timing is retarded. Then, when the temperature reaches a predetermined in-cylinder temperature Ts or at predetermined time T3, an ignition timing retard amount is increased, the ignition timing is set to b [deg. ATDC] at time T4, an exhaust temperature is increased, and catalyst temperature raising is accelerated. In addition, when the in-cylinder temperature is already raised sufficiently at the time of starting the engine, such as after idling stop or restarting immediately after the engine is stopped, the ignition timing may not be advanced at time T1 and the ignition timing may be retarded immediately to shift to a catalyst warm-up operation.

As such, by advancing the ignition timing immediately after starting and raising the in-cylinder temperature rapidly, it is possible to take a large ignition timing retard amount earlier than in the reference example after the in-cylinder temperature is raised. As a result, the exhaust temperature is increased, the catalyst temperature raising is accelerated, and time until catalyst activation is shortened, thereby reducing the exhaust at the time of starting.

The present invention is not limited to the embodiments described above and various modifications are included. For example, the embodiments are described in detail to facilitate the description of the present invention and the present invention is not limited to including all of the described configurations. In addition, a part of the configurations of the certain embodiment can be replaced by the configurations of other embodiments or the configurations of other embodiments can be added to the configurations of the certain embodiment. In addition, for a part of the configurations of the individual embodiments, addition/removal/replacement of other configurations can be performed.

REFERENCE SIGNS LIST 1 air flow sensor
2 electronically controlled throttle
4 supercharger
4a compressor
4b turbine
5a intake-side variable valve timing mechanism
5b exhaust-side variable valve timing mechanism
6 intake manifold
7 intercooler
9 air-fuel ratio sensor
10 three-way catalyst
11 wastegate valve
12 accelerator opening sensor
13 injector for in-cylinder direct fuel injection
13a injector for in-cylinder direct gas injection
14 intake pressure sensor
15 cylinder
16 exhaust pipe
17 ignition plug
18 piston
20 ECU
40 EGR pipe
41 EGR valve
42 EGR cooler
43 differential pressure sensor
44 EGR temperature sensor
45 intercooler bypass valve A
46 intercooler bypass valve B
47 intercooler bypass flow passage
100 engine

The invention claimed is:

1. An internal combustion engine control apparatus comprising:
an engine control unit configured to perform an ignition timing control to control an ignition timing of an ignition device attached to an internal combustion engine, and
to perform an in-cylinder temperature raising control to
raise an in-cylinder temperature of a cylinder after a cold start of the internal combustion engine,
close an exhaust valve before a top dead center of an exhaust stroke and open an intake valve after the top dead center of the exhaust stroke, responsive to determining that a first predetermined time after start is reached, thereby providing a negative valve overlap (NVO) period where an exhaust is compressed,
gradually retard the ignition timing of the ignition device until a first predetermined ignition timing is reached; and
responsive to determining that a predetermined in-cylinder temperature or a second predetermined time after start is reached, retard further the ignition timing of the ignition device until a second predetermined ignition timing later than the first predetermined ignition timing is reached.

2. The internal combustion engine control apparatus according to claim 1, wherein non-combustible gas is injected into a cylinder during the NVO period and a pressure in a combustion chamber is increased.

3. The internal combustion engine control apparatus according to claim 1, wherein the in-cylinder temperature raising control is performed to set an intake valve closing timing to the vicinity of a bottom dead center to eliminate blow back to an intake pipe, in an intake stroke or a compression stroke.

4. The internal combustion engine control apparatus according to claim 1, wherein the in-cylinder temperature raising control is performed to increase a mechanical compression ratio in a compression stroke or an exhaust stroke.

5. The internal combustion engine control apparatus according to claim 1, wherein, during in-cylinder temperature raising by the in-cylinder temperature raising control of the engine control unit, the ignition control is performed to advance the ignition timing compared to an ignition timing during engine start and then to retard the ignition timing of the ignition device.

\* \* \* \* \*